Figure 1:
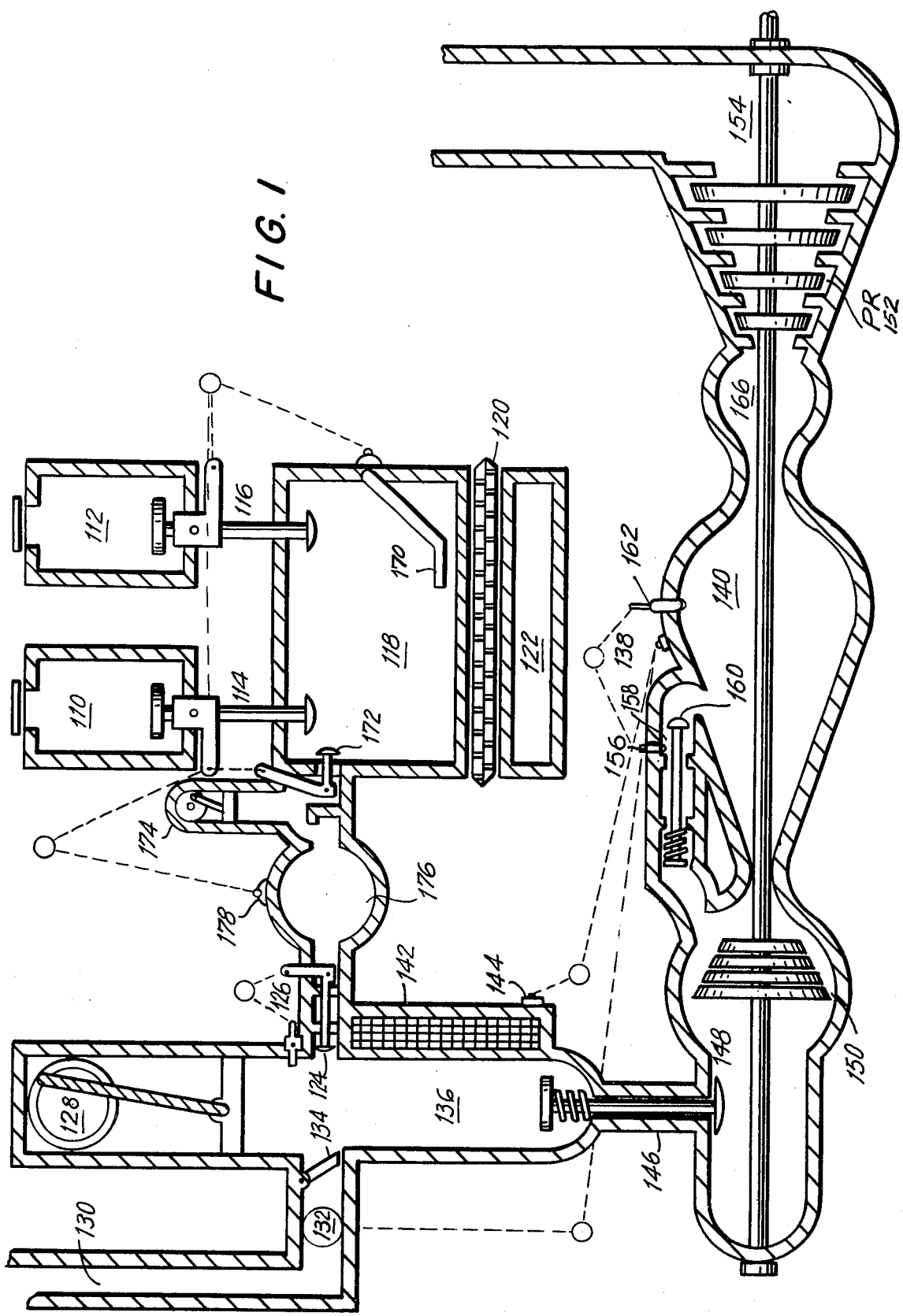

United States Patent [19]

Manzato et al.

[11] 4,054,027

[45] * Oct. 18, 1977

[54] CONVERTIBLE HYDROGENATOR AND GAS TURBINE

[76] Inventors: Gustave A. Manzato; Camille B. Manzato, both of 28 Mountain Ave., Rockaway, N.J. 07866

[*] Notice: The portion of the term of this patent subsequent to May 18, 1993, has been disclaimed.

[21] Appl. No.: 657,238

[22] Filed: Feb. 11, 1976

Related U.S. Application Data

[63] Continuation-in-part of Ser. No. 540,137, Jan. 28, 1975, Pat. No. 3,956,882.

[51] Int. Cl.² .......................... F02C 3/22; F02C 7/22
[52] U.S. Cl. ........................... 60/39.12; 60/39.46 G
[58] Field of Search ................. 60/39.12, 39.46 R; 123/1 A; 48/61, 116, 117, 199 R, 199 FM; 23/282; 423/657, 658

[56] References Cited

U.S. PATENT DOCUMENTS

| | | | |
|---|---|---|---|
| 2,332,915 | 10/1943 | Jaubert | 23/282 |
| 2,602,289 | 7/1952 | Anxionnaz et al. | 60/39.46 |
| 2,984,978 | 5/1961 | Griffith | 60/39.46 |
| 3,540,854 | 11/1970 | Brooke et al. | 48/81 |
| 3,574,560 | 4/1971 | Von Sturm et al. | 23/282 |
| 3,956,882 | 5/1976 | Manzato et al. | 60/39.12 |

FOREIGN PATENT DOCUMENTS

2,115,765  12/1972  Germany .............................. 123/1 A

Primary Examiner—Carlton R. Croyle
Assistant Examiner—L. J. Casaregola
Attorney, Agent, or Firm—Paul J. Sutton

[57] ABSTRACT

A hydrogen motor is disclosed which includes first and second chamber means for containing, respectively, a hydrogen-producing reactant and a hydrogen-replacing reactant that is reactive with hydrogen-producing reactant in order to produce hydrogen gas. The contents of the first and second chamber means are received in reactant chamber means which are in fluid communication with reservoir means for receiving the hydrogen gas produced by the reaction of the hydrogen-producing reactant and the hydrogen-replacing reactant. A gas mixing chamber is in fluid communication with the reservoir means for receiving the hydrogen gas and is also in fluid communication with a source of oxidizing reactant-gas. Compressor means compress the gaseous content of the gas mixing chamber which is then discharged into a combustion chamber where it is ignited prior to working on output means that drive an output shaft.

2 Claims, 2 Drawing Figures

CONVERTIBLE HYDROGENATOR AND GAS TURBINE

This is a continuation-in-part application of our co-pending application Ser. No. 540,137, filed Jan. 28, 1975, and now U.S. Pat. No. 3,956,882.

The present invention relates generally to the motor arts and more particularly to a novel hydrogen motor.

The present invention relates to apparatus for generating hydrogen using reactants and for heating and supplying the hydrogen properly charged with an oxidizing reactant gas such as air, into a combustion chamber whereby the heat generated by the combustion is kept under constant control. The heat produced by combustion is utilized to expand air and/or steam for the purpose of producing a power output. The present invention therefore utilizes the clean heat produced by the combustion of hydrogen and air to develop high efficiency clean energy.

At ordinary temperatures, hydrogen is relatively inactive chemically. However, when hydrogen is heated, it enters into very active chemical reactions. This physical property of hydrogen is taken into consideration for the purpose of utilizing it in a practical way for everyday use in producing readily available power. Also taken into consideration is the fact that the mixture of hydrogen and air will not ignite if the ratio thereof is too small. Because of its low density, hydrogen diffuses faster than any other gas and thus makes it possible to easily alter the hydrogen/ air ratio. It thus becomes essential that the combustion takes place in one step after the hydrogen has been charged with air to avoid the effects of diffusion.

The present invention contemplates the elimination of most of all of the limitations and disadvantages of conventional solutions to recognized needs of the art, by providing novel apparatus and methods and the intercooperation of both. Accordingly, it is an object of our invention to provide relatively inexpensive and reliable apparatus for developing high efficiency, clean energy.

The apparatus of this invention comprises two containers of appropriate sizes, each of which is filled with a chosen reactant and each of which is provided with means for transferring their contents into a mixing chamber through electrically operated valves that control the flow of the reactants. The valves are connected with an ignition key and are controlled by an accelerator by increasing or decreasing the size of the openings of the valves. Therefore, the flow of reactants will be either increased or decreased in order to effect, proportionately, the production of hydrogen in the mixing chamber.

The mixing chamber has, at its bottom, a rotating strainer that covers a removable container which is arranged to receive the salts produced during the reaction. The upper portion of the mixing chamber is provided with an outlet chamber having a fixed diameter opening that is governed by an electrically controlled valve. The valve is connected operatively with a suction and compression pump that is positioned at the top of a gas mixing chamber.

The gas mixing chamber is provided with an air outlet which has a variable volume capacity due to the presence of a thermostat controlled rotating diaphragm placed at the opening thereof. A one-stroke gravitational valve is placed in the air inlet of the gas mixing chamber. At its bottom end, the gas mixing chamber has an outlet that is controlled by a spring-biased valve which will open during the compression stroke of the suction/compression pump in order to allow the mixed gas to flow into a compressor wherein it is ignited. A heating unit is applied to the gas mixing chamber and includes a thermostat-type control switch that is connected with the combustion chamber so that the heating unit will be turned off when a desired temperature is reached in the combustion chamber.

The compressor is provided with a rotor that discharges the compressed gas into the combustion chamber via a compressed gas elbow duct which includes a springbiased pressure valve that will open at the compression of the gases in order to allow the desired volume of gas to flow into the combustion chamber. As the valve closes, a portion thereof makes contact with the switch placed in the elbow duct with the switch being operatively connected to the spark plug placed in the combustion chamber in order to ignite the gas therein. The combustion chamber has an outlet that is in fluid communication with a pressure chamber and finally to an exhaust chamber wherein a rotor may be placed to provide usable energy.

The thermostat at the combustion chamber is also connected with the air diaphragm that controls the inlet to the gas mixing chamber so that, should the temperature in the combustion chamber increase above a desired, safe level, the air diaphragm will be caused to rotate and will allow a larger volume of air into the gas mixing chamber so that, in accordance with the kinetic theory of gases, the proper, safe temperature will be restored.

The suction and compression pump is connected with an accelerator which, when pressed or released, will either increase or decrease the speed of the pump, thus effecting, in direct proportion, the production of hydrogen, the frequency of combustion and the production of energy. During its suction stroke, the pump will operate on the hydrogen intake valve placed between the reactant chamber means and the gas mixing chamber means by means of an intake switch so that a constant volume of hydrogen is supplied to the gas mixing chamber means. During the same suction stroke the pump will operate on the air intake of a one-stroke gravitational valve in order to allow the required quantity of air to enter the gas mixing chamber.

Figure 2:
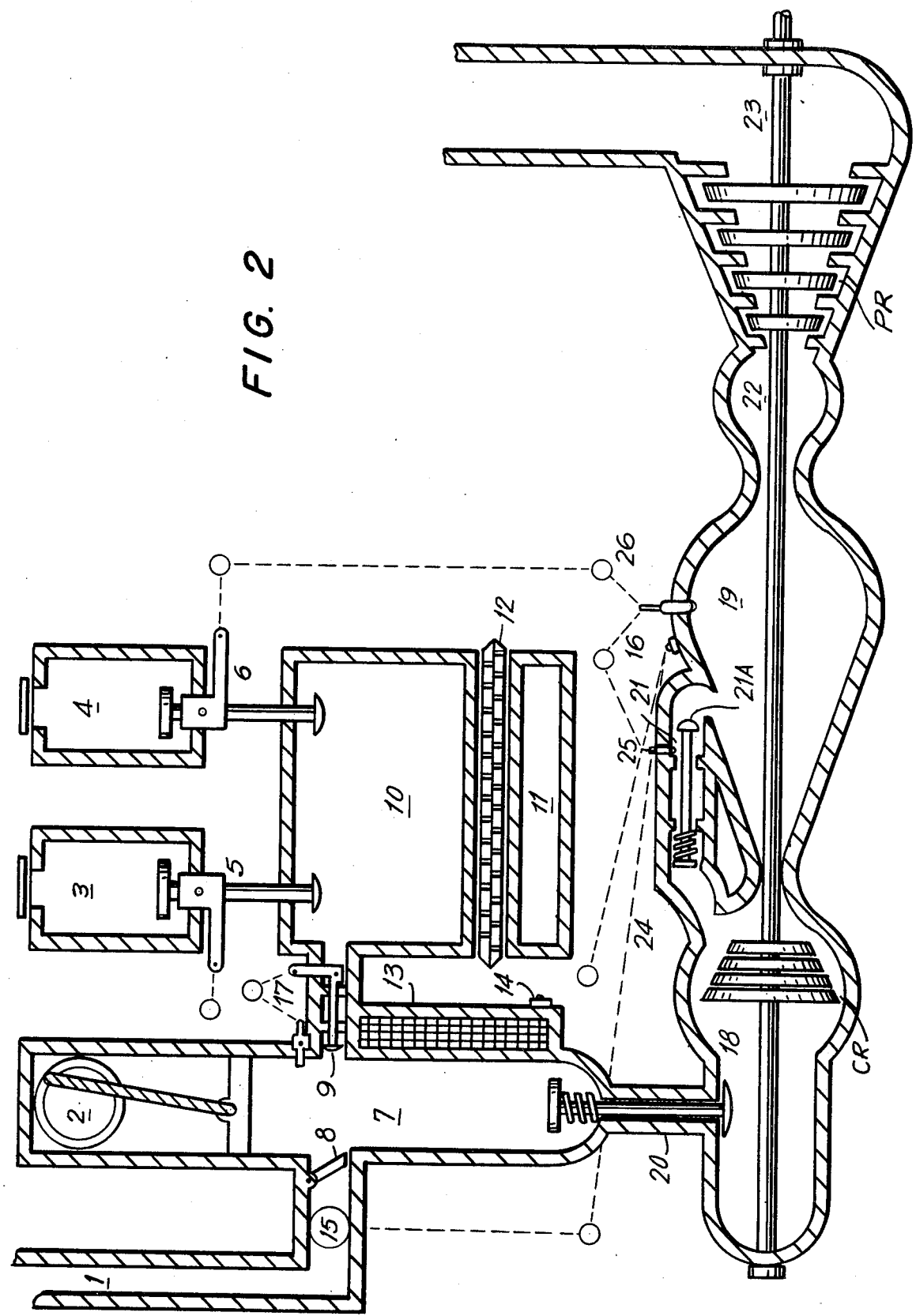

The invention will be more clearly understood from the following description of a specific embodiment thereof, together with the accompanying drawings, in which:

FIGS. 1 and 2 are diagrammatic and schematic illustrations of the present invention.

Referring now to FIG. 1, containers 110 and 112 are used for the reactants and valves 114 and 116 control the flow of the reactant from the containers 110 and 112, respectively. A reactant chamber 118 is in fluid flow communication with both of the containers 110 and 112, and a rotating strainer 120 is provided below the reactant chamber 118. A removable container 122 is provided for the precipitates (salts) of the reaction.

A valve 124 is placed at the outlet of the hydrogen reservoir 176 and is governed by an intake switch 126 which is connected with a section-compression pump 128.

A duct 130 is provided for intake of air and is controlled by an air diaphragm 132 that is positioned upstream of an air intake one-stroke valve 134. A gas mixing chamber 136 communicates with valve 134 a thermostat 138 is located in a combustion chamber 140. Thermostat 138 is also connected with a heating unit 142 that operates on a switch 144 that is applied to the heating unit 142. A valve 146 is provided intermediate gas mixing chamber 136 and a compression chamber 148 in order to control the flow of gases from gas mixing chamber 136 to compression chamber 148. Reference character 150 designates the compression rotor which is rotatably placed in compression chamber 148, and reference character 152 represents the propulsion rotor which is placed in an exhaust chamber 154. A contact switch 156 is placed in an elbow duct 158 and is operated by the edge of a valve head 160 when the compression of gases into combustion chamber 140 is completed. A spark plug 162 ignites the gas in chamber 140 and causes the gas to flow through a downstream compression chamber 166 and then into exhaust chamber 154, through propulsion rotor 152.

A level gauge 170 is placed in reactant chamber 118 and is operatively connected to valves 114 and 116, as shown by the dotted lines. An outlet valve 172 is also provided in reactant chamber 118 and operates in timed relationship with a second suction-compression pump 174 that discharges the hydrogen from reactant chamber 118 into a hydrogen reservoir 176. A pressure gauge 178 indicates when the desired pressure has been achieved in the reservoir 176. Valve 124 is operatively intermediate hydrogen reservoir 176 and gas mixing chamber 136.

Referring now to FIG. 2, containers 3 and 4 are for the reactants, valves 5 and 6 are for the control of the flow of reactants. Chamber 10 is the mixing chamber, 12 is the rotating strainer and 11 is the removable container for precipitates (salts). Valve 9 is placed at the outlet of mixing chamber 10 and is governed by intake switch 17 which is connected with the suction-compression pump 2.

Duct 1 is for the air intake governed by the air diaphragm 15 placed before air intake one-stroke valve 8 communicating with blender/heater gas mixing chamber 7 and connected with thermostat 16 placed at the combustion chamber 19. Thermostat 16 is also connected with heating unit 13 and operates on switch 14 applied to the heating unit. A valve 20 is provided intermediate chamber 7 and chamber 18 to control the flow of gases from chamber 7 to chamber 18. CR is the compression rotor placed in the compression chamber 18 and PR is the propulsion rotor placed at the exhaust chamber 23. Contact switch 25, placed in elbow duct 21 is operated by the edge of valve head 21A when compression of gases into the explosion chamber is completed and will operate on spark plug 26 which will ignite the gas in chamber 19 and cause them to flow through compression chamber 22 into exhaust chamber 23 through propulsion rotor PR.

One advantage of the present invention is the fact that a great variety of reactants may be used according to the availability of the material at the time when energy is needed. Reactants such as acids on metals may be used. Alternatively, the reaction on kerosene of a solution of water and sodium hydroxide would be as follows:

$$C_{12}H_{24} + 12\,Na(OH) + 24\,H_2O \rightarrow 12\,Na\,H\,C\,O_3 + 36\,H_2 \uparrow$$

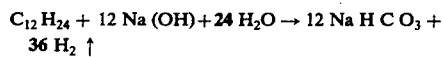

Thus, by employing 1,080 grams of material of which 168 grams are kerosene, 480 grams are sodium hydroxide and 432 grams are water, 72 grams of hydrogen or 2,400 Kcal equivalent to 168 HP for one hour as against 2,020 Kcal or the equivalent of 139 HP for one hour is obtainable from the normal use of kerosene. This represents an improvement of 26% or, from the standpoint of energy conservation and economy, of 26% of fuel.

From the standpoint of economy, the value of the by-product (Na H C O$_3$) obtained may be easily calculated.

It is also possible to use cellulose in reaction with zinc chloride or with caustic alkali and carbon disulfide as an indirect approach for using solar energy that is stored in plants by the process of photosynthesis.

Cellulose, which is contained in the fiber of all plants in the presence of moisture and zinc chloride, reacts as follows:

$$c_6H_{10}O_5 + 12\,ZnCl_2 + H_2O \rightarrow 6\,CCl_4 + 12\,ZnO + 12\,H_2 \uparrow$$

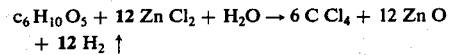

Thus, if the molecular weight of cellulose (162), zinc chloride (136) and water (18) is considered, it will be evident that, by using 1,948 grams of these materials, 24 grams of hydrogen will be obtained which is the equivalent of 3256 BTU. It is well known that hydrogen has the heat equivalent of 33,900 calories per gram, of 61 BTU/lb. Considering an efficiency of 56% which is normal for gas turbines, the weight equivalent of one gallon of gasoline of this material employed in the structure comprising the present invention would yield 28½ HP hours. Considering the value of the by-products obtainable from the process, it will be evident that the present invention provides a very convenient method of obtaining energy, especially if gasoline or kerosene prices remain high.

The embodiment of the invention, particularly disclosed here, is presented merely as an example of the invention. Other embodiments, forms and modifications of the invention coming within the proper scope of the appended claims will, of course, readily suggest themselves to those skilled in the art.

What is claimed is:

1. A hydrogen motor comprising: first chamber means for containing a hydrogen-producing reactant; second chamber means for containing a hydrogen-replacing reactant, for producing hydrogen gas; reactant chamber means in fluid communication with said first and said second chamber means for receiving at least a portion of the contents thereof; reservoir means in fluid communication with said reactant chamber means for receiving the hydrogen gas; first means for discharging the hydrogen gas from said reactant chamber means into said reservoir means; gas mixing chamber means in fluid communication with said reservoir means for receiving the hydrogen gas and in fluid communication with a source of an oxidizing reactant gas, said gas mixing chamber means including substantially one-way inlet valve means intermediate the interior thereof and the source of the oxidizing reactant gas; a rate-of-feed control valve means intermediate said inlet valve means and the source of oxidizing reactant gas; means for heating the contents of said gas mixing chamber; compressor means in fluid communication with said gas mixing chamber means for compressing the gaseous content thereof; second means for discharging the contents of said gas mixing chamber into said compressor means; combustion chamber means for receiving and igniting the compressed contents of said gas mixing chamber means; and work output means driven by the compressed gases after the ignition thereof.

2. The hydrogen motor according to claim 1, wherein said heating means is variable.

* * * * *